United States Patent [19]
Pelouch

[11] 3,774,725
[45] Nov. 27, 1973

[54] VEHICLE LIFT
[76] Inventor: James J. Pelouch, 7041 Hilton Rd., Brecksville, Ohio
[22] Filed: Mar. 22, 1971
[21] Appl. No.: 126,606

[52] U.S. Cl............................. 187/8.71, 187/8.61
[51] Int. Cl............................................. B66f 7/08
[58] Field of Search................ 787/8.41, 8.71, 8.72; 254/122; 74/101, 102, 99

[56] References Cited
UNITED STATES PATENTS

| | | | |
|---|---|---|---|
| 2,533,980 | 12/1950 | Weaver | 187/8.71 |
| 2,706,102 | 4/1955 | Cresci | 254/122 |
| 2,281,471 | 4/1942 | Baum | 214/13 |

FOREIGN PATENTS OR APPLICATIONS

| | | | |
|---|---|---|---|
| 1,124,654 | 3/1962 | Germany | 187/8.71 |
| 1,174,625 | 7/1964 | Germany | 187/8.72 |

*Primary Examiner*—Evon C. Blunk
*Assistant Examiner*—James L. Rowland
*Attorney*—Woodling, Krost, Granger & Rust

[57] ABSTRACT

A vehicle lift is provided which is capable of being contained in a very shallow recess in a ground opening or other place of installation. This advantage is accomplished by means of a generally elongated box-like housing which has an open upper end which housing serves to contain first and second lifting assemblies located side by side and operating on generally opposite sides of the position of a vehicle to be lifted. Each of the lifting assemblies comprises a pair of horizontally extending tracks which are located just below the upper open end of the housing. A wheeled dolly is mounted between each pair of tracks for travel between first and second positions in a horizontal direction in moving the lift which includes the lifting assembly, between lower and upper positions. Each of the lifting assemblies also includes a mounting support which serves to connect and mount first and second horizontally swingable and longitudinally extendable arms, each of which carries vehicle engaging pad means thereon which pad means are normally adapted to engage the frame of a vehicle to be raised and lowered. An upper and a lower connecting arm member is provided, each of which has first and second end portions and these arm members serve to connect the wheeled dolly to its mounting support so as to raise and lower the mounting support with its swingable arms which in turn serve to raise and lower the vehicle. The first and second end portions of the upper arm are pivotally connected respectively to the wheeled dolly and to the mounting support and the first and second end portions of the lower arm are pivotally connected respectively to the wheeled dolly and the mounting support. Imaginary lines drawn through the pivotal connections of the upper and lower arms serve to define the geometric configuration of a parallelogram which configuration is defined at all positions of the lifting assembly. Motive power means are provided for moving each of the lifting assemblies from the aforementioned lower to upper positions and the wheeled dollies from their first to their second positions. The motive power means for each of the lifting assemblies comprises a hydraulic cylinder which cylinder is provided with a piston and a piston rod. Pivot means pivotally connect one end of each of the cylinders to the housing. A link member is provided and cooperates with each hydraulic cylinder and the link member has one end portion pivotally connected to the housing and has the other end portion pivotally connected to the lower arm between its first and second end portions. The piston rod is pivotally connected to the link member between its first and second end portions. Means are provided for mechanically connecting the first and second lifting assemblies together to assure that they move vertically together in their movement between the upper and lower positions. This means comprises first and second intermeshing gear segments which are pivotally connected to the housing and first and second connecting members pivotally connected at one of their ends to the housing and pivotally connected at their other ends to a respective gear segment. First and second door members are pivotally connected to the upper open end of the housing and act to cover the first and second lifting assemblies respectively in their lower positions and also act to cover the opening in the housing in the upper position of the lifting assemblies. Accidental lowering of the lifting assemblies is prevented as disclosed in the specification by engagement of a door member with the upper arm of a lifting assembly.

8 Claims, 7 Drawing Figures

United States Patent [19]
Pelouch
[11] 3,774,725
[45] Nov. 27, 1973
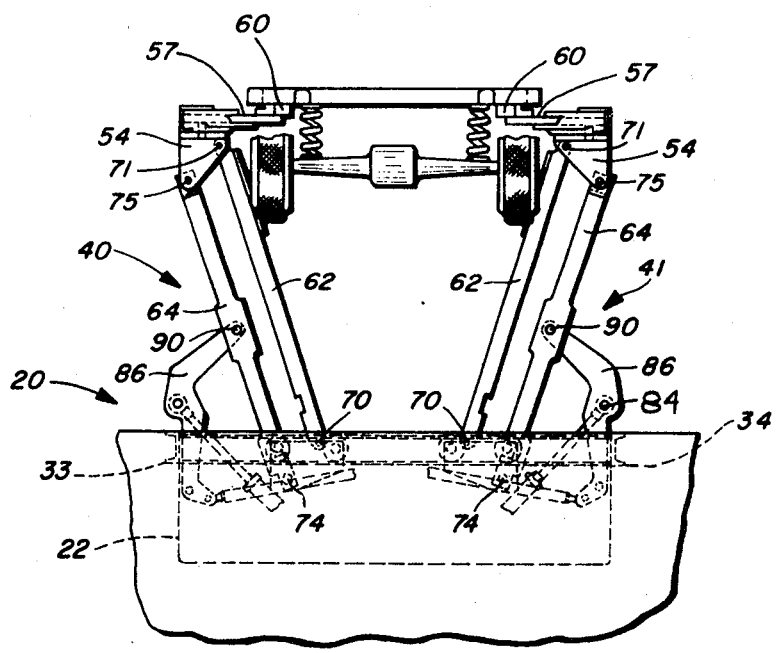

VEHICLE LIFT

The prior art is replete with constructions of vehicle lifts which are designed to be more or less permanently installed below ground level in installations such as the service department of an automobile agency, a gas station or a garage. One of the principal disadvantages in present day constructions is that they include a relatively large piston and cylinder arrangement, for example on the order of 7 feet in length for the cylinder construction and an outside diameter for example of on the order of 18 inches. It will be readily apparent to one reviewing this specification and it is readily apparent to those skilled in the art that this requires a correspondingly large excavation to be made in order to properly or appropriately mount the lift in the ground. It will also be appreciated that in many parts of the country the sub-surface does not accommodate itself well to making the depth of excavations just immediately above referred to. For example some types of sub-soil are primarily or entirely of rock and an excavation of this size must be blasted and in many other parts of the country, for example in Florida, the ground to this great a depth is not solid enough to support a structure such as the piston and cylinder of a lifting assembly.

Other disadvantages in accommodating lift structures described above, comes about when it is desired to mount an automobile vehicle lift on the second floor of a structure. In order to accommodate a lift on the second floor it is necessary that the cylinder be extended down into the normally free portion of the first floor of the structure thereby rendering inoperative for other uses this particular portion of the first floor. Another disadvantage with present day constructions is that the cylinder and piston arrangement is much more difficult to ship and in general much more difficult to move about in the installation process.

The disclosure of the present invention concerns itself with obviating a great many, if not all, of the above referred to disadvantages in present day relatively permanently installed vehicle lifting assemblies. The above referred to disadvantages are done away with primarily by a construction wherein all of the lifting components of the lift, in the down position thereof, can be contained within a housing on the order of not more than 30 inches in thickness or in vertical height. This thickness can be even reduced to a greater degree. All of the aforementioned lifting components referred to include all of the structure with the exception of the swingable and longitudinally extendable lifting arms and pad which are used to engage the frame of a vehicle and which in all instances in this and in most other lifts are located above the ground level of the installation. The present advantages therefore flow from a construction which accommodates itself within the vertical space of approximately 30 inches or less as distinguished from 7 or 8 feet in vertical height as required in most vehicle lift constructions.

The present construction is also capable, because of its unique arrangement, of providing a lifting mechanism which in its movement between a lower to an upper position travels precisely in a vertical line without any lateral movement either in the direction of the front or the rear of the vehicle or in the cross-wise direction of the vehicle. This movement of course is readily accomplished by the standard piston and cylinder arrangement aforementioned but has not been conceived in constructions which can accommodate themselves within the aforementioned small vertical dimension.

Other advantages flow from this given construction in that the present design readily provides a construction whereby the vehicle to be lifted can be driven between the pivotal mounting points for the swinging arms and once the lift has been raised carrying the vehicle, the complete underside of the vehicle is exposed for work by a mechanic operating thereon and the vehicle can be readily walked under and the lift can be walked through, so to speak.

The present construction requires a very small excavation which is an extremely large advantage under present day economic conditions because at times the cost of the excavation and installation approaches the cost of the lift itself. It will also be appreciated that the present lift can be readily installed on the second floor of a structure and in the case where the sub-soil is not conducive to lift installations, the present lift can be installed because of the very small depth which it occupies. The present construction is also easily installed and shipped because, with the exception of the swinging arms, it is all contained within the housing which contains the mechanism in the down position of the lift. It will also be appreciated after a review of the present disclosure that a much smaller amount of hydraulic fluid is required to operate the present device and an actual comparison would indicate about 5 gallons of hydraulic fluid required in the present lift as compared to 40 gallons of hydraulic fluid in a present day full hydraulic lift and about the same for a semihydraulic.

Another advantage realized in the present construction is that no air pressure is required as in the conventional lifts, which air in conventional lifts provides a problem in that it has a tendency to collect moisture which contaminates the oil and which in turn causes rusting and malfunction of the very large piston. The present design disclosed herein also has the unique advantage in that it can be removed from any assembly with which it is installed whereas the conventional lifts are practically impossible to remove.

Other objects and a fuller understanding of this invention may be had by referring to the following description and claims, taken in conjunction with the accompanying drawings, in which:

Figure 1:
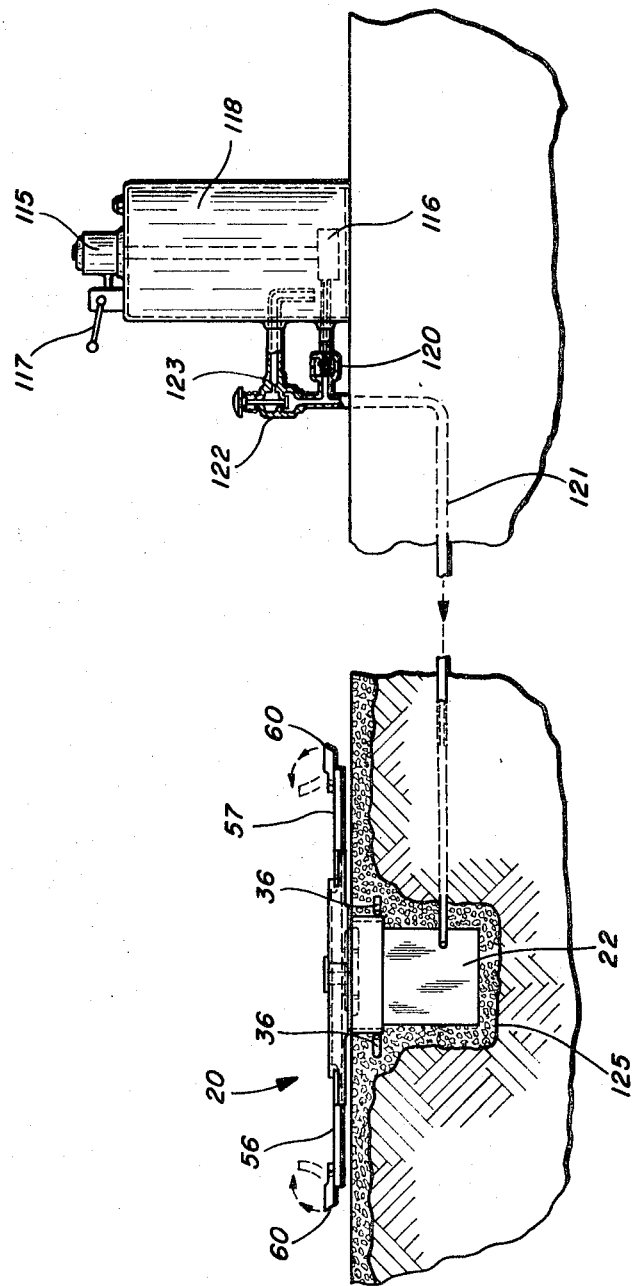
FIG. 1 is an elevational view partially in section of the lift of the present invention and showing its installation below ground level.

The vehicle lift of the present invention has been indicated generally by the reference numeral 20 and as shown in the various figures, this lift includes in combination a generally elongated box-like housing 22 which has an open upper end which is adapted to be closed by first and second door members 24 and 25 respectively, which doors are provided with hinges 27 and 28 respectively.

The housing 22 includes first and second inwardly turned side channels 30 and 31 respectively at an upper portion of the housing which channels are connected at their opposed ends by first and second end channels 33 and 34 respectively. Secured to each of the first and second side channel members 30 and 31 are what have been referred to as outrigger members both identified by the reference numeral 36 which are provided for a reason which will be discussed hereinafter.

Figure 6:
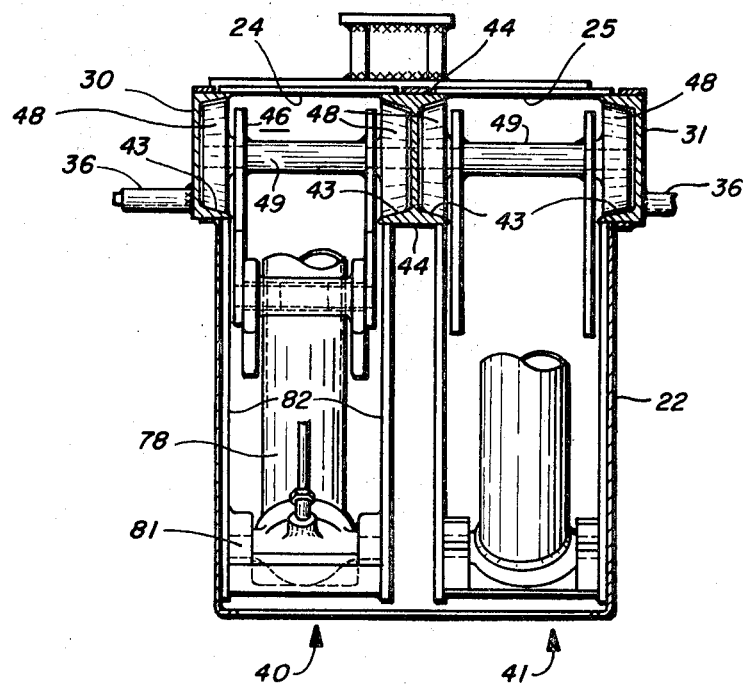
FIG. 6 is a view taken generally along the line 6—6 of FIG. 4.
Figure 3:
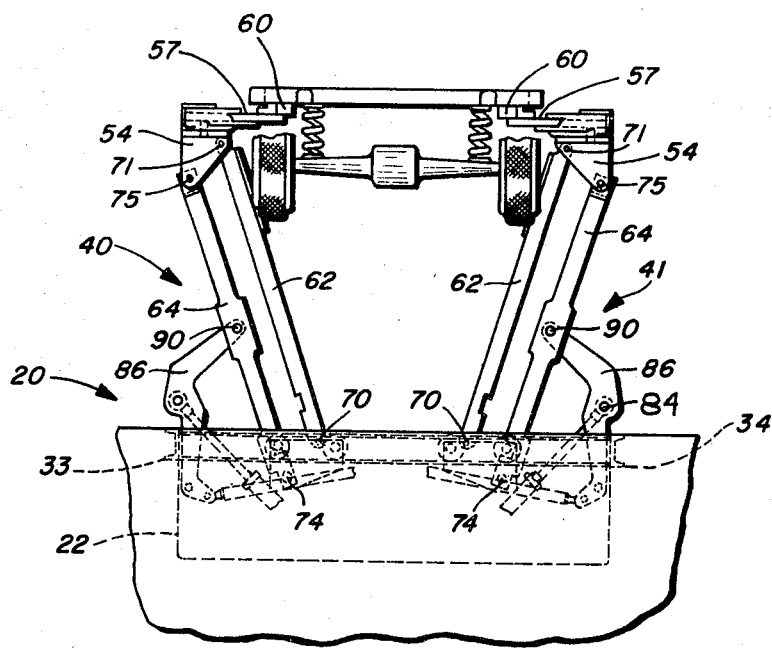
FIG. 3 is a view of the lift shown in FIGS. 1 and 2 from the side of the lift and in the direction of the end of a vehicle handled thereby and showing the lift in its raised condition and supporting a vehicle.

The housing 22 is adapted to house or contain first and second lifting assemblies 40 and 41 respectively which as will be seen from FIG. 6 are adapted to be contained within the housing in what may be referred to as a side-by-side relationship. These lifting assemblies are adapted to raise and lower in a simultaneous fashion the swingable lifting arms which are carried on opposed sides of the lift assembly and which serve to engage opposite sides of the vehicle being handled. Since these lifting assemblies are identical in construction only one will be described in detail.

Each of the lifting assemblies 40 and 41 comprises a pair of horizontally extending tracks mounted in the housing just below the upper open end thereof. All of the tacks have been identified by the reference numeral 43 and it will be seen, particularly from FIG. 6, that the tracks are formed on the inner surfaces of the channels 30 and 31 and on opposed sides of an I-beam or two channels fastened back to back 44 which is located intermediate channels 30 and 31 and extends in the same direction. A wheeled dolly sometimes otherwise referred to as a guided member is identified by the reference numeral 46 and is adapted for movement in a horizontal direction between first and second positions. The wheeled dolly is indicated in its first position in FIG. 4 and in its second position in FIG. 5 and these are the two extreme positions between which the dolly moves, in moving the vehicle lift between its lower and its upper position. The wheeled dolly is comprised of four wheels all of which are identified by the reference numeral 48 which wheels are connected together by means of axles 49.

A mounting support 54 also forms parts of the lifting assembly and this mounting support serves to carry or support first and second horizontally swingable and longitudinally extendable arms 56 and 57. All of the swinging arms are mounted for pivotal movement about respective pivot points all of which have been identified by the reference numeral 58. Each of the swinging arms is adapted to carry a conventional vehicle engaging pad 60.

Upper and lower connecting arm members 62 and 64 respectively are provided, each of which has first and second end portions 66 and 67 respectively. These arm members are for the purpose of connecting the wheeled dolly 46 to its respective mounting support so that the appropriate lifting movement in the appropriate vertical direction can be accomplished. The first and second end portions of the upper connecting arm member are pivotally connected respectively to the wheeled dolly and the mounting support at pivot points 70 and 71. The first and second end portions of the lower arm member are pivotally connected respectively to the wheeled dolly 46 and the mounting support 54 at pivot points 74 and 75 respectively. It will be observed that imaginary lines drawn through points 70 and 71, through points 74 and 75, through points 70 and 74 and points 71 and 75 define the geometric configuration of a parallelogram which configuration is important from the standpoint of the present invention.

Motive power means are provided for moving each of the lifting assemblies from the lower to the upper position and the wheeled dollies from their first to their second position. The motive power means for each of the lifting assemblies is identical and only one will be described. This motive power means comprises a hydraulic cylinder 78 which is provided with a piston 79 and a piston rod 80 which is adapted to move in a conventional manner. Pivot means 81 serve to pivotally connect the lower end of each cylinder to the housing 22 and the pivot means 82 are supported by means of parallel mounting plates 82 which are best seen in FIG. 6.

A link member 86 is provided and cooperates with each hydraulic cylinder 78 in moving the assembly between upper and lower positions. The link member has one end portion pivotally connected to the housing as indicated at 88 and has the other end pivotally connected to the lower connecting arm member 64 between its first and second end portions at 90. The piston rod 80 is pivotally connected at 84 to link member 86 between its end portions.

Figure 4:
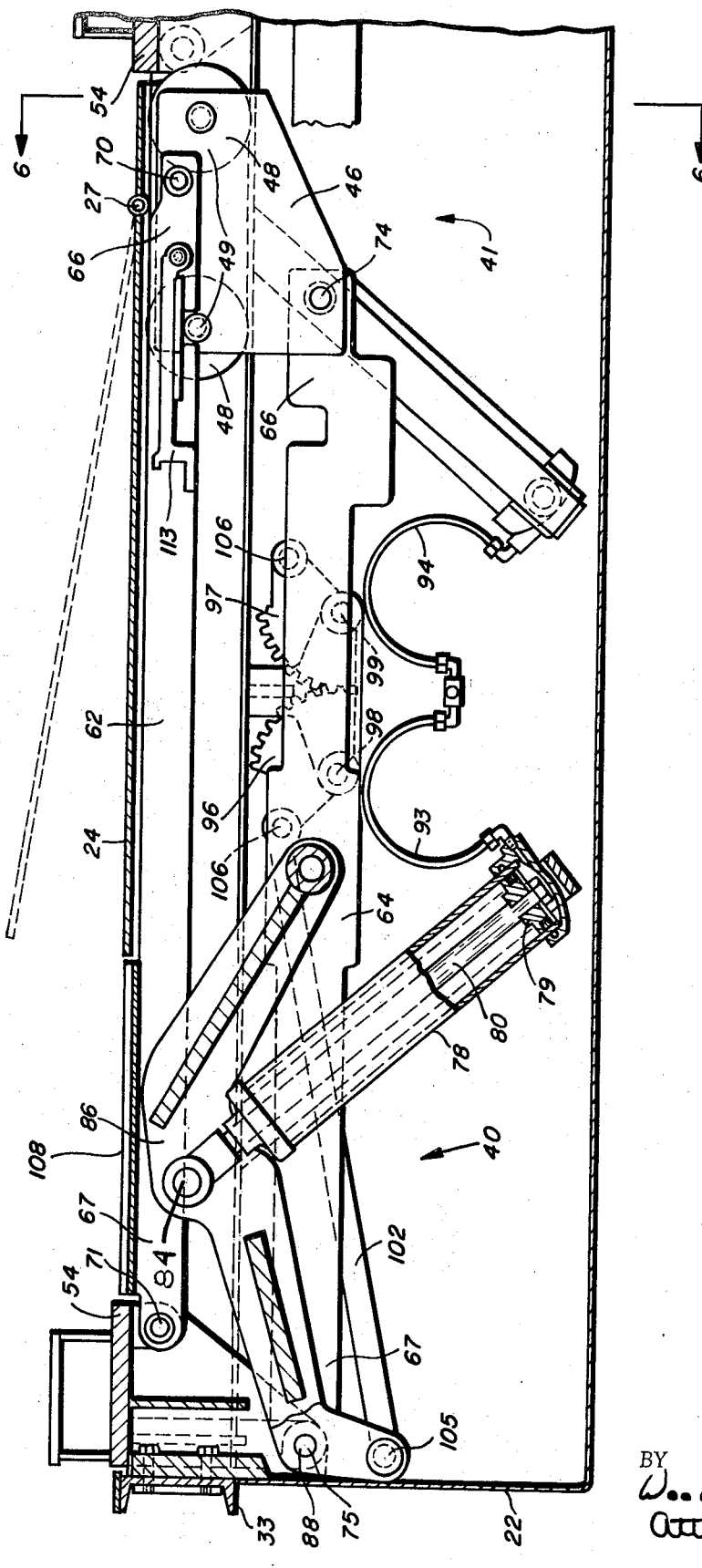
FIG. 4 is an enlarged view partially in section taken in the same direction as the view of FIG. 3 and showing the lifting assemblies in their lowered condition.
Figure 5:
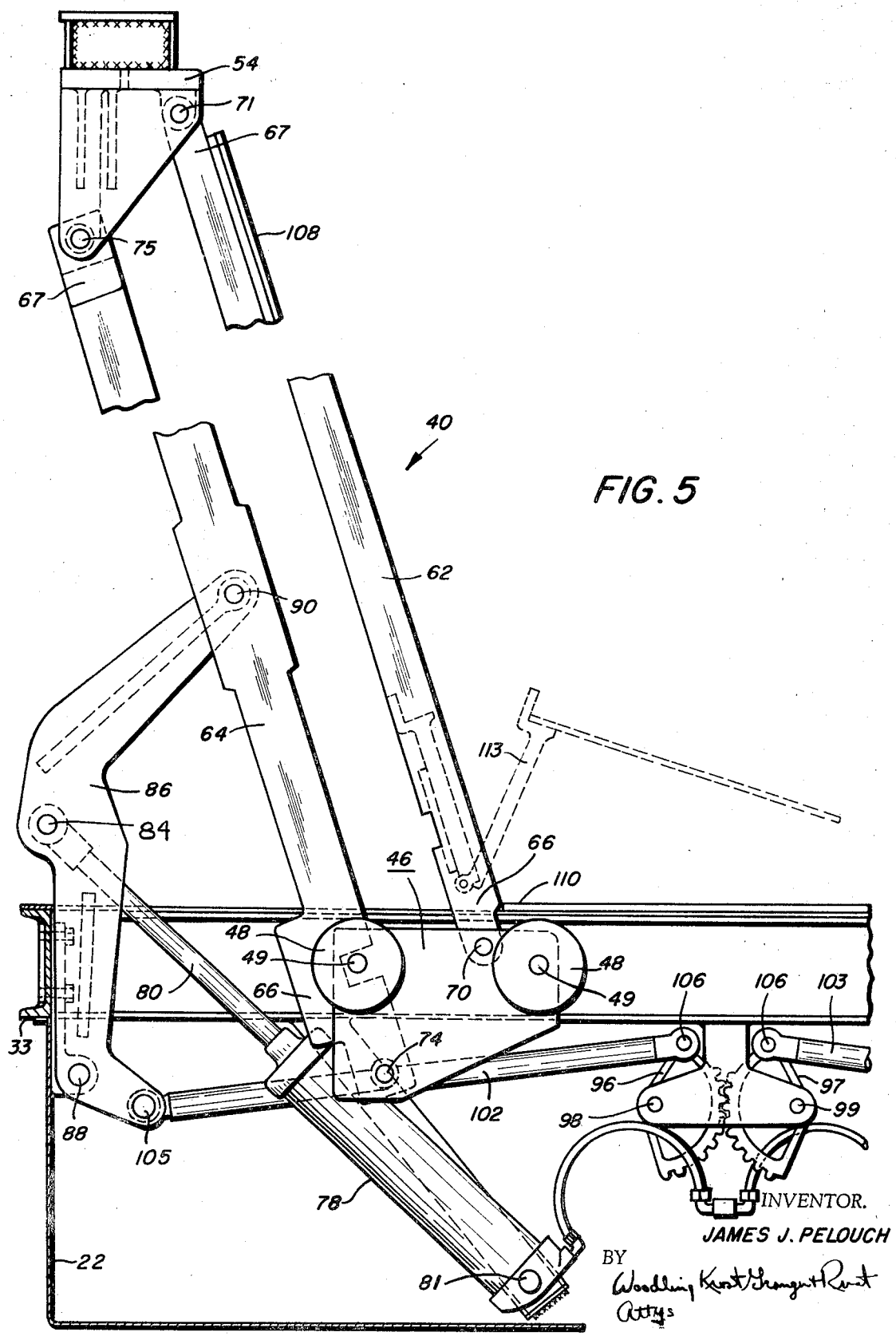
FIG. 5 is a view similar to FIG. 4 but showing the lifting assembly on the left of FIG. 4 in its completely raised or vertical position.
Figure 7:
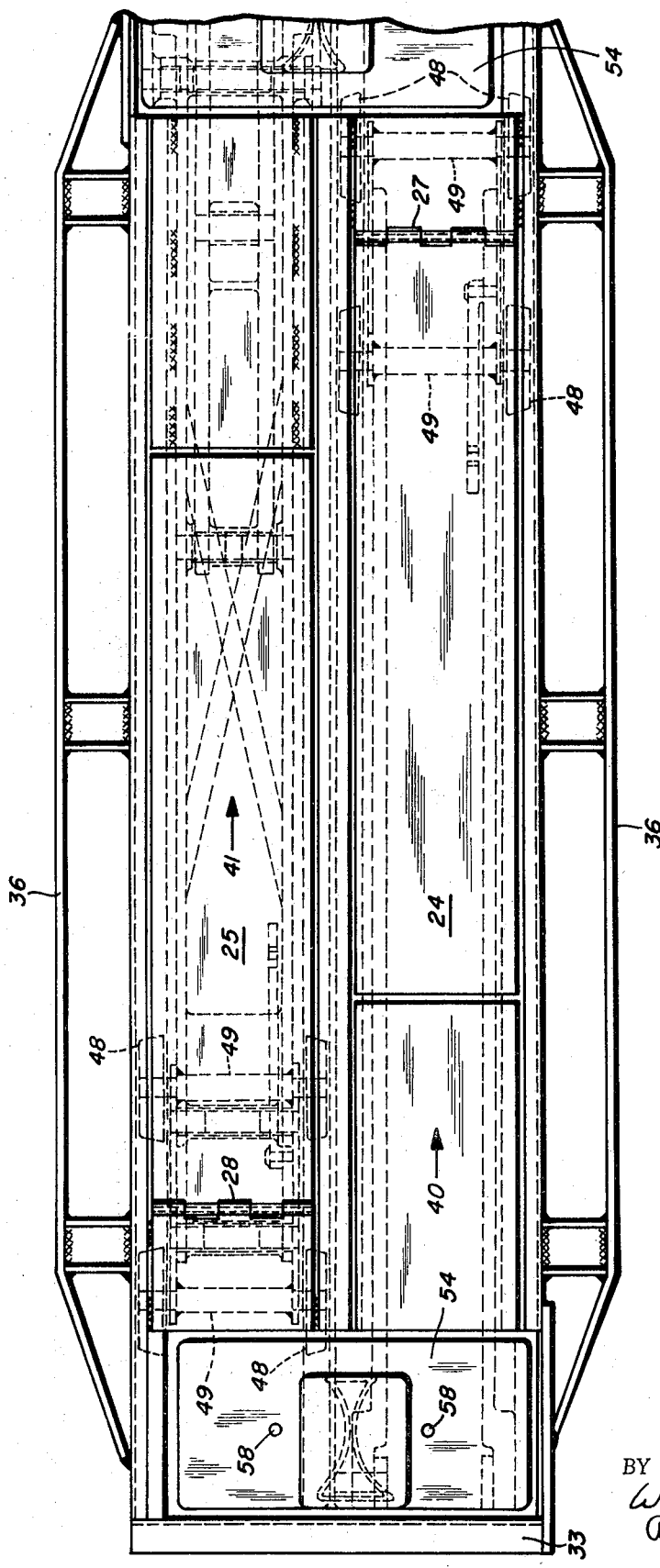
FIG. 7 is a plan view of FIG. 4.

The hydraulic cylinders 78 are actuated and operate in a conventional manner and as will be noted particularly in FIGS. 4 and 5, hydraulic lines 93 and 94 serve to introduce hydraulic fluid into the lower end of the cylinders so as to move the lifting assemblies upwardly and when it is desired to lower the lifting assemblies the hydraulic fluid is exhausted from the cylinders through hydraulic lines 93 and 94. It will be appreciated by those skilled in the art that in view of the fact that hydraulic fluid is being introduced into two separate and independent cylinders, it would be quite probable that one of the cylinders would be actuated in a manner either slower or faster than the other cylinder. To correct this, means have been provided for mechanically connecting the first and second lifting assemblies together to assure that they move vertically together. This means comprises first and second intermeshing gear segments 96 and 97 respectively which are pivotally connected to the housing as shown at pivot points 98 and 99 respectively. First and second connecting members 102 and 103 are provided and each is pivotally connected at one of its ends to link 86 as indicated at pivot point 105 and the other end is pivotally connected as indicated at 106 to its respective gear segment. This assures that the lifting assemblies will travel in unison so that each of the mounting supports 54 are located at exactly the same vertical position at exactly the same time.

It will also be noted, particularly in FIGS. 4 and 5, that the upper connecting arm members 62 are provided with a closure member 108 which is welded or otherwise appropriately attached thereto which serves the function of closing the housing completely in the down position of the lift. These members in the raised condition of the lift travel with the upper connecting member as seen in FIG. 5. It will also be noted from FIG. 5, that the appropriate door member engages a portion of the upper connecting arm member as indicated at 110 and this prevents the accidental lowering of the lift in case there is some malfunction. A latch member 113 is carried by each of the lifting assemblies. The latch member performs the function of holding the door in the dotted line position seen in FIG. 5 when it is desired to lower the lift. In other words, the door is raised to the dotted line position and engages the latch member at which time the lift can be lowered.

FIG. 1 additionally shows the controls for appropriately actuating the lift and to this end it will be noted that there is provided an electric motor 115 which is adapted to drive a hydraulic pump 116 when an appropriate switch 117 is thrown between off and on positions. The hydraulic fluid pump is contained within a sump 118 and when the pump is appropriately actuated it supplies hydraulic fluid under pressure to the cylinders 78 through a check valve 120 and conduit 121. When it is desired to lower the lift it is only necessary that a valve 122 manually be opened which valve is always biased to a closed position by means of a spring. The pump is of course deactuated. The fluid then flows from the cylinders 78 back into the sump through the valve 122 and the lowering rate of the lift can be controlled by means of a restriction 123 placed between the valve 122 and the sump 118.

The advantages of the present invention can best be appreciated from an understanding of the installation of the particular device and in this regard, reference may be had to FIG. 1. This view of the vehicle lift is taken in the same direction as the direction of the enlarged view shown in FIG. 6. It will be appreciated by those skilled in the art that in order to install the vehicle lift, it is necessary to provide an excavation in the ground which conforms to the cross-section shown in FIGS. 1 and 6 and which is of a length and of a plan cross-section corresponding to that shown in FIG. 2. Once the excavation has been made, the next procedure is to locate the box-like housing 22 in the position shown in FIG. 1. This can be accomplished, for example, by driving stakes or like devices at the very bottom of the excavation, then positioning the box-like housing 22 as shown and completely pouring the concrete, identified by the reference numeral 125, which fills in completely around the sides and the bottom of the housing. The slab for the floor level in the area around the swinging arms of the vehicle lift is also provided and is usually of concrete. An alternative procedure is to pour the lower slab or footer in the excavation so that the box-like housing can be subsequently placed in the excavation and will be supported by the slab. The remaining concrete can then be poured around the sides of the housing and can also be formed into the slab at the floor level. In either instance the same end result is accomplished and it will be seen that the concrete which is poured around the sides of the box-like housing also surrounds the outrigger members 36 as well as the shoulders formed by channel members 30 and 31. Concrete also fills in and forms around the channel members 33 and 34 and this particular arrangement serves to locate the box-like housing 22 permanently within the installation. As mentioned hereinabove, the excavation and installation of this particular arrangement is made exceptionally easy when taking into consideration the fact that the vertical height required as seen in FIG. 1, from the bottom of the box-like housing to the floor level, is only on the order of 30 inches. As mentioned hereinabove, it is possible under some circumstances to reduce this even more, say down to on the order of 26 or 27 inches by changing the angle of the inclination of the cylinders 78, as seen in FIG. 4. In other words, the angle of inclination of the cylinders, as seen in FIG. 4, with the horizontal would be reduced to a smaller angle which would result in a small loss in lifting power, however, accomplishing the desired result of further reducing the vertical height of the entire assembly. It will be appreciated that this is an extremely large advantage particularly when keeping in mind that the cost of installation of vehicle lifts sometimes approaches or even exceeds the cost of the lift itself. This is even more pronounced in those circumstances where installations cannot be made under any condition, for example, when there is not enough solid subsoil to support a normal vehicle lift installation or in those circumstances when the subsoil is so rocky or of such other construction that it is extremely expensive to make an excavation. In those instances where it is desired to make the installation on the second floor, it is impossible to do so with present designs and avoid the necessity of an unsightly and cumbersome lift cylinder projecting into the area of the floor below.

Figure 2:
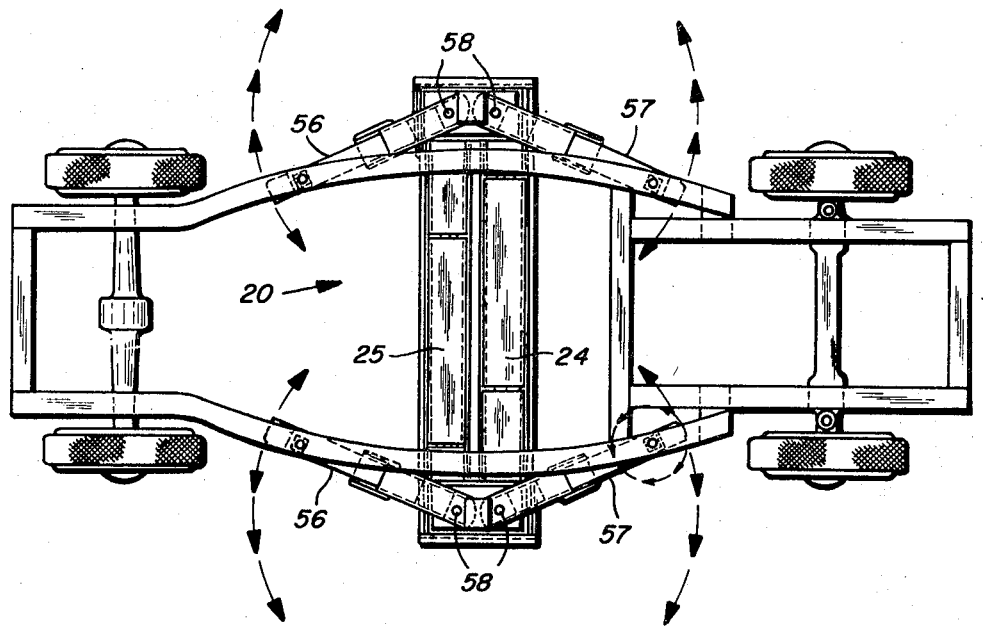
FIG. 2 is a plan view of the lift shown in FIG. 1 with the swinging arms arranged in position to engage the frame of a vehicle.

In operation the vehicle to be raised by the vehicle lift of the present invention, is driven between the points 58 of pivotal connection of the swinging arms 56 and 57 on either side of the vehicle. This is accomplished with the arms being arranged parallel to the direction of the car so the wheels of the vehicle do not engage any portion of the arms. The swinging arms are next swung about their points of pigotal connection as indicated in FIG. 2 so as to bring the vehicle engaging pads 60 into alignment with the frame of the vehicle. It will be appreciated that FIGS. 1 and 2 show the lift in its lowermost position. FIG. 4 also shows the lifting assembly in its lowermost position and before the lifting sequence commences. The next step is for an operator of the vehicle lift to throw the switch 117 to its on position which causes actuation of the electric motor, and in turn actuation of the hydraulic pump 116. This causes hydraulic fluid to be discharged from the sump 118 through conduit 121 and to hydraulic lines 93 and 94 to which conduit 121 is connected (not shown) and then to hydraulic cylinders 78. The introduction of hydraulic fluid under pressure to hydraulic cylinders 78 causes the pistons 79 to be urged upwardly which in turn causes the mounting supports 54 which mount the swinging arms 56 and 57 to move upwardly from the position shown in FIG. 4 to the position shown in FIG. 5. Because of the parallelogram type of construction between the upper and lower connecting arm members 62 and 64, and because of the construction and arrangement of the link member 86, the mounting supports 54 which carry the swinging arms are caused to travel in a precisely vertical movement of travel with no forward or rearward lateral movement or any sidewise lateral movement. This, of course, is extremely necessary in the raising of a vehicle from a floor because the path of the movement must be in a vertical direction. It will be seen that the distances between points 75 and 90, 90 and 74, and 90 and 88 are equal and the distance between points 71 and 70 is equal to distances 75–90 plus 90–74. Points 75, 90 and 74 must be in the same plane and lines through points 75–74 and 71–70 must be parallel. This assures that the plate at the top of mounting support 54 always remains parallel to the floor or ground level. When the lifting assemblies have reached their uppermost vertical position, the door members 24 and 25 occupy the position shown in full line in FIG. 5 wherein engagement is accomplished at point 110 which prevents accidental lowering of the lift. When it is desired to lower the lift, the door members are raised to the dotted-line position shown in FIG. 5 and placed into engagement with the latch members 113 and then the lift can be lowered. It is then only necessary for an operator to open the valve 122 which permits the hydraulic fluid to return to the sump by way of conduit 121 and restriction 123. The restriction 123 prevents the lift from lowering too rapidly. The size of this restriction can be changed to change the rate at which the lift returns to its lowermost position.

It will therefore be seen from reviewing the above-referred to construction and operation of the present device that all of the aforementioned advantages are accomplished and the disadvantages inherent in prior art devices are obviated. It will also be appreciated that for in any given installation, for example, in a large present day service garage for automobiles, that a single electric motor 115 and hydraulic pump 116 can be utilized for raising a plurality of lifts. In other words for a multiple lift installation it is not necessary that a multiplicity of electric motors and pumps be provided. It will also be appreciated by those skilled in the art that the present mechanical construction arrangement while initially appearing to be of the so called "scissors type" found in some prior art constructions, it is not such a construction in that a precise vertical lifting arrangement is accomplished in this invention which is not possible in "scissors type" lifting arrangements.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An automobile vehicle lift including in combination a box like housing having an upper open end, first and second lifting assemblies located in said housing, each said lifting assembly comprising a pair of horizontally extending tracks mounted in said housing just below the upper open end thereof, a wheeled dolly mounted by said pair of horizontally extending tracks for travel between first and second positions in a horizontal direction in moving the lift including said lifting assembly between lower and upper positions, a mounting support mounting first and second horizontally swingable and longitudinally extendable arms each of which carries vehicle engaging pad means, an upper and a lower connecting arm member each having first and second end portions connecting said wheeled dolly to its mounting support, said first and second end portions of said upper arm being pivotally connected respectively to said wheeled dolly and said mounting support, said first and second end portions of said lower arm being pivotally connected respectively to said wheeled dolly and said mounting support, said pivotal connection of said first and second end portions of said upper and lower arms defining the geometric configuration of a parallelogram, motive power means for moving said lifting assemblies from said lower to said upper position and said wheeled dollies from said first to said second positions comprising a hydraulic cylinder for each lifting assembly and each cylinder having a piston and piston rod, pivot means pivotally connecting one end of each said cylinder to said housing, a link member cooperating with each hydraulic cylinder and having one end portion pivotally connected to said housing, and having the other end portion pivotally connected to said lower arm between its first and second end portions, said piston rod being pivotally connected to said link member between its first and second end portions, means mechanically connecting said first and second lifting assemblies together to assure that they move vertically together comprising first and second intermeshing gear segments and first and second connecting members pivotally connected at one of their ends to a respective link member and pivotally connected at their other ends to a respective gear segment, first and second door members pivotally connected to the upper open end of said housing and acting to cover said first and second lifting assemblies in their lower positions and acting to cover the housing in their upper positions, said first and second door members engaging said upper arm of said first and second lifting assemblies respectively in their upper positions to prevent accidental lowering of the same.

2. In an automobile vehicle lift the provision of at least one lifting assembly comprising a guideway means disposed generally in a plane, a guided member movable back and forth in said guideway means, a supporting member movable along a line normal to said plane and carrying vehicle engaging arms which are movable in a plane generally parallel to said plane, first and second connecting arms each having first and second end portions, said first and second end portions of said first connecting arm being pivotally connected respectively to said guided member and said supporting member, said first and second end portions of said second connecting arm being pivotally connected respectively to said guided member and said supporting member, and motive power means operably connected to said lifting assembly to move said guided member in said guideway and said supporting member along said line which is normal to said plane.

3. A lifting assembly for use in an automobile lift and as claimed in claim 2, wherein said motive power means includes a link member pivotally connected to a fixed structure at one end portion and pivotally connected at the other end to said first connecting arm at a position between its end portions.

4. A lifting assembly for use in an automobile lift and as claimed in claim 3, wherein said motive power means includes a fluid cylinder pivotally connected at one end to a fixed structure and having a piston rod extending from the other end which piston rod is pivotally connected to said link member between the end portions of said link member.

5. A lifting assembly for use in an automobile lift and as claimed in claim 2, wherein imaginary lines drawn through said pivotal connections of said first connecting arm at said first and second end portions thereof, through said pivotal connections of said second connecting arm at said first and second end portions thereof, through said pivotal connections of said first end portions of said first and second connecting arms and through said pivotal connections of said second end portions of said first and second connecting arms define the geometric shape of a parallelogram.

6. A lifting assembly for use in an automobile lift and as claimed in claim 3, wherein said link member is pivotally connected to said first connecting arm exactly midway between the pivotal connections of said first connecting arm at its first and second end portions, and the distance between the two pivotal connections of said link member is exactly the same as the distance between the pivotal connection of said link member to said first connecting arm and the pivotal connection at said first end portion of said first connecting arm.

7. A lifting assembly for use in an automobile lift and as claimed in claim 5, wherein said link member is pivotally connected to said first connecting arm exactly midway between the pivotal connections of said first connecting arm at its first and second end portions, and the distance between the two pivotal connections of said link member is exactly the same as the distance between the pivotal connection of said link member to said first connecting arm and the pivotal connection at said first end portion of said first connecting arm, said pivotal connection of said link member to said first connecting arm and said pivotal connections at said first and second end portions of said first connecting arm all lying in the same plane.

8. A lifting assembly for use in an automobile lift and as claimed in claim 5 wherein at least two lifting assemblies are utilized and said at least two lifting assemblies are connected together to move at the same time.

* * * * *